US011154082B2

(12) United States Patent
Lele et al.

(10) Patent No.: US 11,154,082 B2
(45) Date of Patent: Oct. 26, 2021

(54) EGG PRODUCT FOR INFANTS AND BABIES AND METHOD OF MAKING SAME

(71) Applicant: LIL MIXINS, LLC, Philadelphia, PA (US)

(72) Inventors: Meenal Lele, Philadelphia, PA (US); Safiya Carter, Ardmore, PA (US)

(73) Assignee: LIL MIXINS, LLC, Philadelphia, PA (US)

( * ) Notice: Subject to any disclaimer, the term of this patent is extended or adjusted under 35 U.S.C. 154(b) by 184 days.

(21) Appl. No.: 16/439,885

(22) Filed: Jun. 13, 2019

(65) Prior Publication Data

US 2020/0390133 A1  Dec. 17, 2020

(51) Int. Cl.
 A23L 15/00 (2016.01)
 A23L 33/00 (2016.01)
 A23P 10/40 (2016.01)

(52) U.S. Cl.
 CPC ............. *A23L 15/30* (2016.08); *A23L 33/40* (2016.08); *A23P 10/40* (2016.08); *A23V 2002/00* (2013.01)

(58) Field of Classification Search
 CPC .......... A23L 15/30; A23L 33/40; A23P 10/40; A23V 2002/00
 See application file for complete search history.

(56) References Cited

U.S. PATENT DOCUMENTS

| | | | |
|---|---|---|---|
| 233,750 | A | 10/1880 | Halvorson |
| 1,630,756 | A | 5/1927 | Parsons |
| 1,891,887 | A | 12/1932 | Clickner |
| 2,139,696 | A | 12/1938 | Reynolds |
| 2,699,996 | A | 1/1955 | Earl |
| 2,999,024 | A | 9/1961 | Stimpson |
| 3,028,245 | A | 4/1962 | Mink |
| 3,060,038 | A | 10/1962 | Mancuso |
| 3,077,411 | A | 2/1963 | Mitchell |
| 3,082,098 | A | 3/1963 | Bergquist |
| 3,093,487 | A | 6/1963 | Jones |
| 3,114,645 | A | 12/1963 | Blanken |
| 3,170,804 | A | 2/1965 | Kline |
| 3,393,074 | A | 7/1968 | Erlich |
| 3,720,253 | A | 3/1973 | Ballas |
| 3,778,425 | A | 12/1973 | Kandatsu |
| 4,279,932 | A * | 7/1981 | Koshida .................. A23P 20/20 426/103 |
| 5,164,217 | A | 11/1992 | Wong et al. |
| 5,487,911 | A | 1/1996 | Ueda |
| 5,736,181 | A | 4/1998 | Bezner |
| 6,149,964 | A | 11/2000 | Theuer et al. |
| 6,358,554 | B1 | 3/2002 | Yoshihide |
| 6,579,551 | B1 | 6/2003 | Theuer |
| 9,731,003 | B2 | 8/2017 | Nadeau |
| 9,913,488 | B2 | 3/2018 | Book |
| 2004/0213885 | A1 | 10/2004 | Bisson |
| 2009/0220674 | A1 | 9/2009 | Katz et al. |
| 2009/0317516 | A1 | 12/2009 | Newsteder |
| 2010/0255039 | A1 * | 10/2010 | Fritsche .................. A23L 33/18 424/275.1 |
| 2014/0234501 | A1 | 8/2014 | Sanl |
| 2015/0079233 | A1 | 3/2015 | Calleja Araque |
| 2016/0338400 | A1 | 11/2016 | Avital et al. |
| 2017/0056494 | A1 | 3/2017 | Nadeau |
| 2018/0020712 | A1 | 1/2018 | Brown |
| 2019/0167577 | A1 | 6/2019 | Leitner |
| 2019/0343162 | A1 | 11/2019 | Yepes |
| 2020/0170262 | A1 | 6/2020 | Reed |
| 2020/0390133 | A1 | 12/2020 | Lele |

FOREIGN PATENT DOCUMENTS

| | | |
|---|---|---|
| CN | 103303 | 5/1989 |
| CN | 1086966 * | 5/1994 |
| CN | 1142915 * | 2/1997 |
| CN | 101690596 | 4/2010 |
| CN | 102613482 * | 8/2012 |
| CN | 106165870 | 11/2016 |
| CN | 107969617 * | 5/2018 |
| EP | 0038684 B1 | 7/1984 |
| GB | 756643 A | 9/1956 |
| WO | 2018/057926 | 3/2018 |

OTHER PUBLICATIONS

English Translation for CN1142915 published Feb. 1997.*
English Translation for CN 1086966 published May 1994.*
English Translation for CN107969617 published May 2018.*
English Translation for CN 102613482 published Aug. 2012.*
Baker's Journal, A Primer on Preservatives Aug. 2015. https://www.bakersjournal.com/a-primer-on-preservatives-6271/.*
American Egg Board; Incredible Egg Cooking School—Soft Meringue; (The Incredible Egg) How To Make A Soft Meringue . . . Retrieved from: https://www.incredibleegg.org/cooking-school/eggs-baking/make-soft-meringue/. Jun. 16, 2017.
Du Toit, et al.; Prevention of food allergy. J Allergy Clin Immunol.; London, United Kingsom; 137 (4). Apr. 2016.
International Search Report and Written Opinion, U.S. Patent and Trademark Office, corresponding Application No. PCT/US2020/023517, dated Jun. 18, 2020.

(Continued)

*Primary Examiner* — Anthony J Weier
(74) *Attorney, Agent, or Firm* — Gottlieb, Rackman & Reisman, P.C.

(57) ABSTRACT

An egg food product is provided that when mixed with baby food and given regularly to a baby will reduce the likelihood of the baby developing a food allergy to eggs. The egg food product is produced by taking whole eggs or egg whites and mixing or whipping them, either by themselves or with other ingredients such as rice, tapioca, wheat, corn, nut flours, soy flour, or bean flour. An acid or acid salt containing food product such as citric acid, lemon juice, and cream of tartar may be added while mixing or whipping the eggs in order to help firm the eggs or egg whites and allow them to retain more air. The resulting batter is then baked in order to produce a cake-like product. The resulting cake is then dried in order to remove substantially all moisture. The dried cake is then ground or milled into a powder.

13 Claims, No Drawings

(56) References Cited

OTHER PUBLICATIONS

Effects on Physical and Functional Properties of Dried Whole Eggs of Cassava (Manihot Esculenta Crantz) Starch Additive and Corn Syrup Additive; Masilungan-Manuel, Joanna Tess, Sino CL, Jarin AV, Vera FC; In 4th International Conference on Biotechnology and Environment Management 2014 (vol. 75, p. 47); Lacsit Press, Singapore; http://www.ipcbee.com/vol75/008-ICBEM2014-S1001.pdf.

How To Make Powdered Eggs; http://tacticalintelligence.net/blog/how-to-make-powdered-eggs.htm Erich/Prepper Academy.

Eggs—Beating Techniques for Egg Whites; Sarah Phillips; craftybaking.com;https://www.craftybaking.com/howto/eggs-beating-techniques-egg-whites.

Feeding babies egg and peanut may prevent food allergy; Imperial College, London, Science Daily; Sep. 20, 2016; https://www.sciencedaily.com/releases/2016/09/160920112328.htm.

Baked Milk- and Egg-Containing Diet in the Management of Milk and Egg Allergy; Leonard SA, Caubet JC, Kim JS, Groetch M, Nowak-Węgrzyn A.; The Journal of Allergy and Clinical Immunology: In Practice. Jan. 1, 2015;3(1):13-23; https://www.sciencedirect.com/science/article/abs/pii/S2213219814004188.

Watson, E; "Lil Mixins makes early introduction of potential allergens easy for parents", [Retrieved from the internet on Feb. 25, 2020]; https://www. food navigator-usa .com/ Article/20 18/08/27/lii-Mixins-makes-early-introduction-of-potential-allergens-easy-for-parents; p. 1. top and bottom; p. 2. picture and bottom: p. 3, top-middle; p. 4, top-middle; Aug. 27, 2018.

International Search Report and Written Opinion, U.S Patent and Trademark Office, Application No. PCT/US2020/0014246, dated Apr. 20, 2020.

\* cited by examiner

EGG PRODUCT FOR INFANTS AND BABIES AND METHOD OF MAKING SAME

BACKGROUND OF THE INVENTION

As is known, food allergy rates have been on the rise over the last several years.

In 2015, the LEAP study was published showing that in high risk children, (even if they skin tested as already sensitized), you could reduce the rate of peanut allergy by 80% by feeding infants peanut protein regularly. These results were so striking, that in that same year, the American Academy of Pediatrics began recommending that all babies be fed peanuts regularly starting between 4 and 6 months old.

Subsequently, several studies and a subsequent meta-analysis have shown that that starting regular exposure of egg between the ages of 4 and 6 months old can provide protection against egg allergy. The problem, however, is that babies cannot eat eggs or cooked eggs in their natural form at that young an age. They choke easily and typically require food in mush or slurry form.

Currently available in the marketplace is the product SpoonfulOne, which is a powder blend of small amounts of different food protein. These food proteins include peanuts, milk, eggs, almonds, soy, wheat, shrimp, cashews, hazelnuts, oat, cod, pecans, salmon, sesame, walnuts, and pistachios. Each daily serving has less than 1 gram total of 16 different proteins. SpoonfulOne is less than desirable since it does not provide a sufficient amount of protein as proven to reduce food allergy rates.

Also available is the product Inspired Start, which is a pouch of pear and egg containing 1 gram of egg protein. Each pouch is produced by puree-ing the desired protein with a very sweet fruit in order to create natural sweetness. The problem with Inspired Start is that it contains too much sugar.

Ready, Set, Food sells a powder in single serve packs which contains peanut, milk, and eggs.

Grocery alternatives include eggs, which must be cooked and prepared for a baby. Scrambled eggs are problematic since they clump, thereby providing a choking risk for a baby. Better preparation is to boil the eggs, and then puree the egg whites into food.

Also, egg powder may be used, which is either freeze-dried, spray dried, or drum dried. When mixed with water, egg powders turn into raw, uncooked egg which must then be prepared like a grocery egg.

Meringue powder, which is cooked meringue ground into a powder, is less than desirable because of the high sugar content too.

Accordingly, it would be desirable to provide an egg food product that is specially created for babies in order to reduce the risk of developing a food allergy. The product should contain a suitable quantity of food protein, and should not be overly processed so as to still retain the fiber and nutrients of the original food. Additionally, the egg food product should have a minimal risk of choking and should have a markedly reduced chance of bacterial or fungal growth.

SUMMARY OF THE INVENTION

Generally speaking, in accordance with the invention, an egg food product is provided that when mixed with baby food and given regularly to a baby will reduce the likelihood of the baby developing a food allergy to eggs. The egg food product is produced by taking whole eggs or egg whites and mixing or whipping them, either by themselves or with other ingredients such as rice, tapioca, wheat, corn, nut flours, soy flour, or bean flour. An acid or acid salt containing food product such as citric acid, lemon juice, and cream of tartar may be added while mixing or whipping the eggs in order to help firm the eggs or egg whites and allow them to retain more air. The resulting batter is then baked in order to produce a crisp cake-like product. The resulting cake is then dried in order to remove substantially all moisture. The dried cake is then ground or milled into a powder.

Accordingly, it is an object of the invention to provide an improved egg food product for infants or babies.

Another object of the invention is to provide an egg food product that has a sufficient amount of food protein.

A further object of the invention is to provide an egg food product that is easy for an infant or baby to eat and digest.

A further object of the invention is to provide an egg product that has been appropriately heated so as to denature the ovoalbumin.

Still, other objects and advantages will be obvious from the following description.

DETAILED DESCRIPTION

The inventive process begins with selecting either whole eggs or egg whites. The eggs or egg whites may be raw, frozen or powdered (spray dried, drum dried or freeze dried). Powdered eggs or egg whites are first reconstituted into a liquid by mixing with water. Frozen eggs or egg whites are first defrosted.

The next step in the inventive process is to mix the eggs or egg whites. This is done by either whipping or stirring. Mixing may include adding one or more other ingredients. For example, the eggs or egg whites may be mixed with one or more of rice, tapioca, wheat, corn, nut flour, soy flour and bean flour. The weight ratio of the eggs or egg whites to the one or more other ingredient is from between 10:1 to 4:1.

An acid-containing food product such as lemon juice or white vinegar, or an acid-salt-containing food product such as cream of tartar may be added to the eggs or egg whites during mixing. This is done in order to stabilize the whipped or stirred eggs. The ratio of the eggs or egg whites to the added acid is between about ⅛ teaspoon per 30 g of egg.

Mixing by either whipping or stirring should take placed for a time period of between 1 and 10 minutes. The resulting meringue or batter is then baked in an oven or similar device for at least 20 minutes and at a temperature of at least 165° C. The purpose of baking is to denature the ovoalbumin.

After baking, the resulting cake is dried in order to further reduce water content, preferably to a water content level in the cake of less than 10%. The now dried cake is ground or milled into a fine powder such that it can pass through a 200 mesh screen.

In use, the ground or milled egg powder is proportioned and fed to infants older than 4 months old by mixing the powder into breastmilk, formula, or developmentally-appropriate pureed foods. Suitable pureed foods include vegetables, fruits, yogurt, or wheat cereal. The baked egg powder of the invention is preferably fed to infants in serving sizes of 5-10 grams at a frequency of 1-3 times per week so as to reduce the risk of allergic sensitization to eggs.

The powdered egg product produced in accordance with the invention is advantageous in that the correct amount of proteins per serving is provided in feeding to an infant. This is because the powder is uniform in nature and the protein content per gram is determined.

The powdered egg product produced in accordance with the invention is advantageous since it has good water absorption and water adhesion characteristics. This is because it is dried and can absorb water. As a result, the powder is easily mixed into pureed food.

The powdered egg product produced in accordance with the invention is advantageous since the individual granules thereof do not adhere to each other. This is because the baking process creates a stable granule. As a result, the powder cannot form a gel or solid when mixed with water. This property prevents risk of choking an infant.

The powdered egg product produced in accordance with the invention is advantageous as it is specifically designed as infant food product. This is because it is easily mixed into any age appropriate food and will not increase choking risk. As a result, it is appropriate to be fed to an infant who can tolerate solid food.

The scope of the invention will now be set forth in the following claims.

The invention claimed is:

1. A method of producing an infant or baby food product comprising:
    mixing whole eggs or egg whites in order to produce a meringue or batter;
    baking the meringue or batter in order to produce a cake;
    drying the cake;
    grinding or milling the dried cake into a powder;
    wherein baking is at a temperature is at least 165° C.;
    wherein baking is for a time period of at least 20 minutes; and
    wherein at least one ingredient selected from the group consisting of rice, tapioca, wheat, corn, nut flour, soy flour and bean flour is added to said eggs or egg whites during said mixing step, and a weight ratio of the whole eggs or egg whites to the at least one selected ingredient is at least 4:1.

2. The method of claim 1, wherein said mixing step is carried out by either whipping or stirring.

3. The method of claim 1, wherein an acid or acid salt containing food product is added to said eggs or egg whites during said mixing step.

4. The method of claim 1, wherein said cake is dried to a water content of less than 10%.

5. The method of claim 1, wherein said dried cake is ground or milled so that resulting powder is of a size such that it can pass through at least a 200 mesh screen.

6. The method of claim 1, wherein said eggs or egg whites are may be raw, frozen or in powdered form.

7. The method of claim 1, wherein the weight ratio of the whole eggs or egg whites to the at least one selected ingredient is at most 10:1.

8. The food product produced by the method of claim 1.

9. A method for reducing the risk of developing a food allergy to eggs, the method comprising preparing a food product in accordance with the steps of claim 1 and feeding said food product to a baby or infant of an age of at least four months old.

10. The method of claim 9, further including mixing the powdered food product into a food selected from the group consisting of breastmilk, formula and a pureed food prior to said feeding step.

11. The method of claim 9, wherein said feeding step is carried out in serving sizes of 5-10 grams of the powdered food product and at a frequency of 1-3 times per week.

12. The method of claim 9, wherein said preparing step includes drying the cake to a water content of less than 10%.

13. The method of claim 12, wherein said preparing step further includes grinding or milling the dried cake into a powder of a size such that it can pass through at least a 200 mesh screen.

* * * * *